(12) United States Patent
Kusachi et al.

(10) Patent No.: US 10,468,729 B2
(45) Date of Patent: Nov. 5, 2019

(54) METHOD FOR PRODUCING NON-AQUEOUS ELECTROLYTE SECONDARY BATTERY

(71) Applicant: Envision AESC Japan Ltd., Zama-shi, Kanagawa (JP)

(72) Inventors: Yuki Kusachi, Kanagawa (JP);
Fumihiro Kawamura, Kanagawa (JP);
Masanori Aoyagi, Kanagawa (JP);
Kousuke Hagiyama, Kanagawa (JP)

(73) Assignee: Envision AESC Japan Ltd., Zama-shi, Kanagawa (JP)

( * ) Notice: Subject to any disclaimer, the term of this patent is extended or adjusted under 35 U.S.C. 154(b) by 360 days.

(21) Appl. No.: 15/109,923

(22) PCT Filed: Dec. 8, 2014

(86) PCT No.: PCT/JP2014/082417
§ 371 (c)(1),
(2) Date: Jul. 6, 2016

(87) PCT Pub. No.: WO2015/104933
PCT Pub. Date: Jul. 16, 2015

(65) Prior Publication Data
US 2016/0329613 A1    Nov. 10, 2016

(30) Foreign Application Priority Data

Jan. 10, 2014  (JP) .................................. 2014-003496

(51) Int. Cl.
*H01M 10/44* (2006.01)
*H01M 10/052* (2010.01)
(Continued)

(52) U.S. Cl.
CPC ....... *H01M 10/446* (2013.01); *H01M 2/1653* (2013.01); *H01M 4/0404* (2013.01);
(Continued)

(58) Field of Classification Search
CPC combination set(s) only.
See application file for complete search history.

(56) References Cited

U.S. PATENT DOCUMENTS 6,468,690 B1 * 10/2002 Barker .............. H01M 10/0525
205/59
2002/0034678 A1   3/2002 Shibuya et al.
(Continued)

FOREIGN PATENT DOCUMENTS

EP        2772981      *  3/2014
EP        2772981 A1     9/2014
(Continued)

OTHER PUBLICATIONS

2015556738, Decision to Grant a Patent (Translated),Jan. 30, 2018 (Year: 2018).*

*Primary Examiner* — Alexander Usyatinsky
(74) *Attorney, Agent, or Firm* — Young Basile Hanlon & MacFarlane, P.C.

(57) ABSTRACT

A method for producing a non-aqueous electrolyte secondary battery including an electrolyte containing an electrolyte salt, a non-aqueous solvent capable of dissolving the electrolyte salt, and plural additives, wherein at least one of the additives has a reduction potential that is nobler than the reduction potential of the non-aqueous solvent. The method includes a first charging step for maintaining battery voltage at a negative electrode potential at which the additive having the noblest reduction potential of the additives is decomposed while the non-aqueous solvent and other additives are not reduced and decomposed and a second charging step for maintaining battery voltage so as to have reduction and decomposition of at least one of the non-aqueous solvents and bring the electrical potential of the negative electrode to at least 0.7 V relative to lithium. By having a uniform
(Continued)

reaction in an electrode, a decrease in durability is suppressed.

10 Claims, 2 Drawing Sheets

(51) Int. Cl.
| | |
|---|---|
| *H01M 10/0567* | (2010.01) |
| *H01M 10/058* | (2010.01) |
| *H01M 2/16* | (2006.01) |
| *H01M 4/04* | (2006.01) |
| *H01M 4/131* | (2010.01) |
| *H01M 4/133* | (2010.01) |
| *H01M 4/1391* | (2010.01) |
| *H01M 4/1393* | (2010.01) |
| *H01M 4/505* | (2010.01) |
| *H01M 4/525* | (2010.01) |
| *H01M 4/62* | (2006.01) |
| *H01M 4/66* | (2006.01) |
| *H01M 10/0525* | (2010.01) |
| *H01M 10/0568* | (2010.01) |
| *H01M 10/0569* | (2010.01) |
| *H01M 10/0585* | (2010.01) |
| *H01M 10/42* | (2006.01) |
| *H01M 10/04* | (2006.01) |
| *H01M 4/02* | (2006.01) |
| *H01M 10/52* | (2006.01) |

(52) U.S. Cl.
CPC ........... *H01M 4/131* (2013.01); *H01M 4/133* (2013.01); *H01M 4/1391* (2013.01); *H01M 4/1393* (2013.01); *H01M 4/505* (2013.01); *H01M 4/525* (2013.01); *H01M 4/622* (2013.01); *H01M 4/623* (2013.01); *H01M 4/625* (2013.01); *H01M 4/661* (2013.01); *H01M 10/049* (2013.01); *H01M 10/052* (2013.01); *H01M 10/058* (2013.01); *H01M 10/0525* (2013.01); *H01M 10/0567* (2013.01); *H01M 10/0568* (2013.01); *H01M 10/0569* (2013.01); *H01M 10/0585* (2013.01); *H01M 10/4235* (2013.01); *H01M 10/44* (2013.01); *H01M 10/52* (2013.01); *H01M 2004/027* (2013.01); *H01M 2004/028* (2013.01); *H01M 2220/20* (2013.01); *H01M 2220/30* (2013.01); *H01M 2300/0025* (2013.01); *H01M 2300/0037* (2013.01); *Y02T 10/7011* (2013.01)

(56) References Cited

U.S. PATENT DOCUMENTS

| | | | |
|---|---|---|---|
| 2007/0154815 A1* | 7/2007 | Kawasaki | H01M 4/131 429/340 |
| 2010/0024204 A1* | 2/2010 | Min | H01M 10/0567 29/623.2 |
| 2013/0244095 A1* | 9/2013 | Min | H01M 2/361 429/185 |
| 2013/0316224 A1* | 11/2013 | Lee | H01M 10/049 429/163 |

FOREIGN PATENT DOCUMENTS

| | | |
|---|---|---|
| JP | 2001325988 A | 11/2001 |
| JP | 2002203609 A | 7/2002 |
| JP | 2007207438 A | 8/2007 |
| JP | 2009140641 A | 6/2009 |
| JP | 2013051210 A | 3/2013 |
| WO | 2010097678 A1 | 9/2010 |
| WO | WO 2013062056 * | 5/2013 |

* cited by examiner

METHOD FOR PRODUCING NON-AQUEOUS ELECTROLYTE SECONDARY BATTERY

CROSS REFERENCE TO RELATED APPLICATION

The entire contents of Japanese Patent Application No. 2014-003496, filed on Jan. 10, 2014, in which the priority right of the present patent application is claimed, are herein incorporated by reference.

TECHNICAL FIELD

The present invention relates to a method for producing a non-aqueous electrolyte secondary battery.

BACKGROUND

By having high energy density, high durability and charging and discharging efficiency, a non-aqueous electrolyte secondary battery, in particular a lithium ion secondary battery, has been widely used as a power source for a mobile device.

Against the background of escalating environmental protection movement in recent years, the application range of a lithium ion secondary battery is broadened for a power source of a large-size system like an electromotive vehicle or a stationary power storage system. With regard to the battery used as such power sources, it is required to have large battery size, improved battery characteristics like high energy density, and high production efficiency for having those battery performances in an economically favorable way.

In a lithium ion secondary battery, when charging and discharging of battery is repeated, a non-aqueous solvent in an electrolyte is decomposed by reacting electrochemically with a negative electrode active material and decomposition products generated by the reaction are deposited as a SEI (Solid Electrolyte Interface) film on a surface of a negative electrode active material. As a result, a problem arises that increased reaction resistance of an electrode is yielded. Furthermore, since the SEI film thus deposited is generally a hard inorganic film, there is also a problem that it may be broken by stress caused by expansion and shrinking of a negative electrode active material during charging and discharging, and thus the characteristics of an electrode are deteriorated.

For such reasons, it is known to add an additive to an electrolyte of a lithium ion secondary battery, and by intentional decomposition of an additive on an electrode surface during initial charging, the decomposition product can function as a protective SEI film for suppressing decomposition of new electrolyte. The SEI film based on the additive is known to exhibit a significant influence on cycle performance, storage performance, charging and discharging efficiency, and safety of a battery.

It is described in JP 2001-325988 A (US 2002/034,678 A) that, plural kinds of non-aqueous solvent are included and an initial charging is performed by a charging step having a step in which charging is performed at a potential at which one non-aqueous solvent is reduced and a step in which charging is performed at a potential at which another non-aqueous solvent is reduced, a favorable SEI film can be formed.

SUMMARY

However, the method described in JP 2001-325988 A has a problem that, when plural additives are present in the electrolyte, a favorable surface film is not formed and the reaction inside the electrode becomes non-uniform, and thus the internal resistance of a battery increases after it is stored for a long period of time.

Accordingly, an object of the present invention is to have a uniform reaction inside an electrode and suppress an increase in internal resistance of a battery after storage for a long period of time even when plural additives are present.

The present invention provides a method for producing a non-aqueous electrolyte secondary battery having plural additives contained in an electrolyte, characterized in that it has a two-stage charging step and, during the first charging step, the battery voltage is maintained at the negative electrode potential at which only the additive having the noblest reduction potential is decomposed. The production method of the present invention is characterized in that, during the second charging step, the battery voltage is maintained at voltage at which the non-aqueous solvent is reduced and decomposed and in which the potential of the negative electrode is at least 0.7 V relative to lithium.

DETAILED DESCRIPTION OF THE EMBODIMENTS

Figure 1:
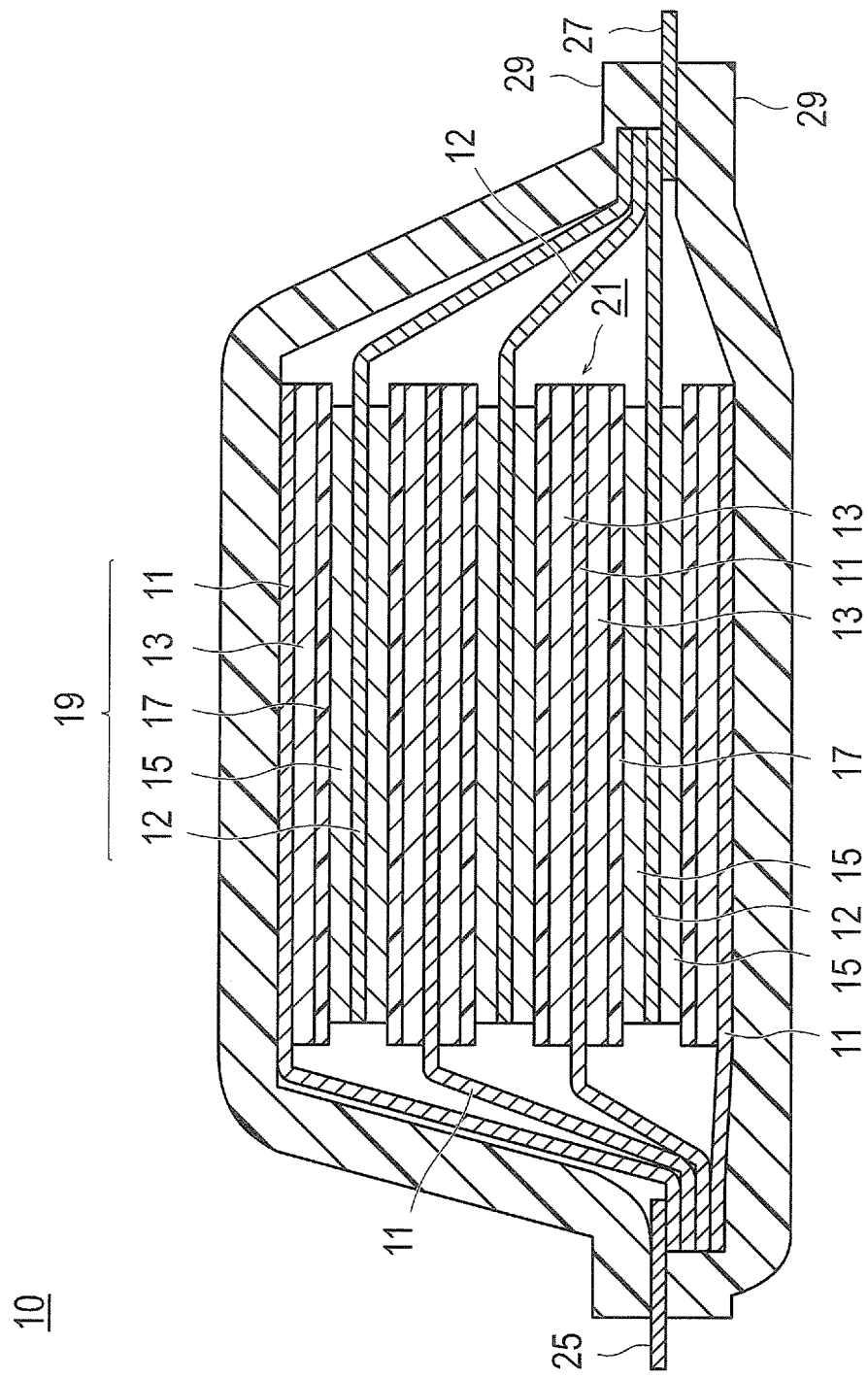
FIG. 1 is a brief cross-sectional view illustrating the basic structure of a non-aqueous electrolyte lithium ion secondary battery, which is a flat type (stack type) and not a bipolar type. 10 indicates a lithium ion secondary battery, 11 indicates a negative electrode current collector, 12 indicates a positive electrode current collector, 13 indicates a negative electrode active material layer, 15 indicates a positive electrode active material layer, 17 indicates a separator, 19 indicates a single battery layer, 21 indicates a power generating element, 25 indicates a negative electrode current collecting plate, 27 indicates a positive electrode current collecting plate, and 29 indicates a battery outer casing material.

An embodiment of the present invention is a method for producing a non-aqueous electrolyte secondary battery including a positive electrode, a negative electrode, and an electrolyte containing an electrolyte salt, a non-aqueous solvent capable of dissolving the electrolyte salt, and plural additives, wherein at least one of the additives has a reduction potential that is nobler than the reduction potential of the non-aqueous solvent, and the method includes an initial charging step including a first charging step for maintaining battery voltage at a negative electrode potential at which the additive having the noblest reduction potential of the additives is decomposed while the non-aqueous solvent and other additives are not reduced and decomposed and a second charging step for maintaining battery voltage (electric voltage) so as to have reduction and decomposition of at least one of the non-aqueous solvents and bring the electrical potential of the negative electrode to at least 0.7 V relative to lithium.

In the aforementioned JP 2001-325988 A, it is described that charging based on insertion of Li is performed only after forming a film by having charging for reducing and decomposing only a film-forming material like vinylene carbonate (paragraph [0030]). However, because JP 2001-325988 A has a charging step that is specifically designed to form a film based on vinylene carbonate, there can be a problem of having non-uniform film forming in a battery in which additives with reaction potential significantly different from that of vinylene carbonate are used as a mixture, for example.

According to this embodiment, only the additive which is decomposed at the noblest reduction potential undergoes the reduction and decomposition during the first charging step, and film forming proceeds with the reduction and decomposition product. Since an electrochemical reaction of other non-aqueous solvent/additives does not occur during this step, a uniform film with fewer defects can be formed. Furthermore, during the second charging step, a SEI film based on decomposition product of a solvent like ethylene carbonate is formed on the SEI film formed in the first charging step, and as a result, a SEI film with lamination structure is formed.

Furthermore, according to the reduction and decomposition reaction of a solvent like ethylene carbonate, forming of a SEI film proceeds in conjunction with gas generation, and the gas generation continues until the reaction rate of the solvent decomposition becomes sufficiently slow. In this embodiment, during the second charging step, the battery voltage is maintained at voltage at which the electric potential of the negative electrode is 0.7 V or more than 0.7 V relative to lithium, and thus gas generation rate becomes sufficiently slow and a significant amount of the gas generated between the electrodes can be released to the outside of a battery laminate. Accordingly, there is less gas remaining in the electrodes. Therefore, it can be prevented that an insertion and desorption reaction of lithium in the active material occurs in the state of having gas generation inside the battery laminate, and as a result, a reaction on the electrode surface becomes non-uniform. Consequently, a battery with high durability can be obtained.

Thus, according to this embodiment, the film forming proceeds only by the additive with the noblest reduction potential in the first charging step so that a uniform film can be formed. Furthermore, during the second charging step, the voltage is maintained until the rate of generating gas, which is caused by reduction and decomposition of a solvent, becomes sufficiently slow. Thus, it can be prevented that the reaction progresses in a state of having gas generation and the reaction on an electrode surface is non-uniform. Accordingly, the obtained battery has a uniformly progressing electrode reaction, and it exhibits an inhibited increase in internal resistance of a battery even after it is stored for a long period of time.

This embodiment is a method for producing a non-aqueous electrolyte secondary battery. First, a typical example of a non-aqueous electrolyte secondary battery obtained by a method of this embodiment is explained with a use of a figure. Hereinafter, a description will be made of a non-aqueous electrolyte lithium ion secondary battery as a preferred embodiment of the non-aqueous electrolyte secondary battery, but it is not limited thereto. Meanwhile, the same elements are given with the same symbols for the descriptions of the drawings, and overlapped descriptions are omitted. Further, note that dimensional ratios in the drawings are exaggerated for the sake of description, and are different from actual ratios in some cases.

[A Whole Constitution of a Non-Aqueous Electrolyte Secondary Battery]

FIG. 1 is a cross-sectional view schematically illustrating the basic constitution of a non-aqueous electrolyte lithium ion secondary battery which is not a bipolar type of a flat type (stack type) (hereinbelow, it is also simply referred to as a "stack type battery"). As illustrated in FIG. 1, the stack type battery 10 according to this embodiment has a structure in which a power generating element 21 with a substantially rectangular shape, in which a charge and discharge reaction actually occurs, is sealed inside of a laminate outer casing material 29 as an outer casing body. Herein, the power generating element 21 has a constitution in which a positive electrode, the separator 17, and a negative electrode are stacked. Meanwhile, the separator 17 has an electrolyte (for example, electrolyte solution) within it. The positive electrode has a structure in which the positive electrode active substance layer 15 is disposed on both surfaces of the positive electrode current collector 12. The negative electrode has a structure in which the negative electrode active substance layer 13 is disposed on both surfaces of the negative electrode current collector 11. Specifically, one positive electrode active substance layer 15 and the neighboring negative electrode active substance layer 13 are disposed to face each other via the separator 17, and the negative electrode, the electrolyte layer and the positive electrode are stacked in this order. Accordingly, the neighboring positive electrode, electrolyte layer and negative electrode form one single battery layer 19. As such, it can be also said that, as plural single battery layers 19 are stacked, the stack type battery 10 illustrated in FIG. 1 has a constitution in which electrically parallel connection is made among them.

Meanwhile, on the outermost layer negative electrode current collector which is present on both outermost layers of the power generating element 21, the negative electrode active substance layer 13 is disposed only on a single surface. However, an active substance layer may be formed on both surfaces. Namely, not only a current collector exclusive for an outermost layer in which an active substance layer is formed on a single surface can be achieved but also a current collector having an active substance layer on both surfaces can be directly used as a current collector of an outermost layer. Furthermore, by reversing the arrangement of the positive electrode and negative electrode of FIG. 1, it is also possible that the outer most layer positive electrode current collector is disposed on both outermost layers of the power generating element 21 and a positive electrode active substance layer is disposed on a single surface or both surfaces of the same outermost layer positive electrode current collector.

The positive electrode current collector 12 and negative electrode current collector 11 have a structure in which each of the positive electrode current collecting plate (tab) 27 and negative electrode current collecting plate (tab) 25, which conductively communicate with each electrode (positive electrode and negative electrode), is attached and inserted to the end part of the laminate outer casing material 29 so as to be led to the outside of the laminate outer casing material 29. If necessary, each of the positive electrode current collecting plate 27 and negative electrode current collecting plate 25 can be attached, via a positive electrode lead and negative electrode lead (not illustrated), to the positive electrode current collector 12 and negative electrode current collector 11 of each electrode by ultrasonic welding or resistance welding.

Meanwhile, although a stack type battery is illustrated in FIG. 1 instead of a bipolar type of a flat type (stack type), it can be also a bipolar type battery containing a bipolar type electrode which has a positive electrode active substance layer electrically bound to one surface of a current collector and a negative electrode active substance layer electrically bound to the opposite surface of the current collector. In that case, one current collector plays both roles of a positive electrode current collector and a negative electrode current collector.

Method for producing non-aqueous electrolyte secondary battery: Since the initial charging step is performed for an uncharged non-aqueous electrolyte secondary battery, a non-aqueous electrolyte secondary battery is prepared first.

Step for preparing uncharged non-aqueous electrolyte secondary battery: A known method of a related art may be employed for a step for preparing an uncharged non-aqueous electrolyte secondary battery. For example, in the case of a lamination type battery, an electrode slurry mixture containing electrode materials such as active material, conductive aid, or binder is first dispersed in a solvent for adjusting slurry viscosity to prepare a positive electrode active material slurry and a negative electrode active material slurry and the slurries are applied on a current collector. After that, the positive electrode and negative electrode are laminated so as to face each other via a separator, and thus a single battery is produced. Then, till to have a desired number of single batteries, lamination of separator and electrodes is repeated.

Step for Producing Electrode:

(1) Step for Preparing Active Material Slurry

This step is a step for preparing an active material slurry by adding a solvent for adjusting slurry viscosity (NMP or the like) to an active material, a conductive aid, a binder or the like followed by mixing and further addition of the solvent to adjust the viscosity. Specifically, by using a homogenizer, a kneading device or the like, the active material slurry is prepared as a slurry (ink) from a solvent for adjusting slurry viscosity and a solid matter.

The active material slurry may optionally contain a conductive aid, a binder, a solvent for adjusting slurry viscosity or the like in addition to the positive electrode/negative electrode active material.

Viscosity of the active material slurry may be within a broad viscosity range. Considering the coating property or the like, the viscosity of the active material slurry is preferably 500 to 10000 mPa·s, more preferably 800 to 9000 mPa·s, and more preferably 1000 to 8000 mPa·s. Solid matter concentration in the active material slurry is preferably 40 to 90% by weight, and more preferably 50 to 70% by weight.

Positive electrode active material: The positive electrode active material layer contains a positive electrode active material. The positive electrode active material has a composition which allows ion adsorption during discharging and ion desorption during charging. Preferred examples thereof include a lithium-transition metal composite oxide, which is a composite oxide of a transition metal and lithium. Specifically, Li.Co based composite oxides such as $LiCoO_2$, Li.Ni based composite oxides such as $LiNiO_2$, Li.Mn based composite oxides such as spinel $LiMn_2O_4$, Li.Fe based composite oxides such as $LiFeO_2$ and composite oxide of which transition metal is partly replaced with other elements (for example, composite oxide in which part of the nickel atoms of Li.Ni based composite oxide is replaced with other metal element, specifically, lithium nickel cobalt composite oxide or lithium nickel manganese cobalt composite oxide) may be used. Those lithium-transition metal composite oxides are a low cost material with excellent reactivity and cycle characteristics. Thus, by using those materials for an electrode, a battery with excellent output characteristics may be produced. In addition to above, as a positive electrode active material, phosphoric acid compounds or lithium sulfuric acid compounds of transition metal and lithium such as $LiFePO_4$; oxides and sulfides of transition metals such as $V_2O_5$, $MnO_2$, $TiS_2$, $MoS_2$, or $MoO_3$; $PbO_2$, AgO, NiOOH, or the like may be also used.

Among the above, it is preferable to use, as a positive electrode active material, at least lithium nickel cobalt composite oxide and/or lithium nickel manganese cobalt composite oxide. When those positive electrode active materials are used, since the positive electrode potential at early charging stage during initial charging is less noble than the oxidation potential of the additives and solvent, a reduction and decomposition reaction occurs on a priority basis on a surface of negative electrode. Accordingly, a uniform film may be formed efficiently. Meanwhile, the lithium nickel cobalt composite oxide and/or lithium nickel manganese cobalt composite oxide includes a composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

The positive electrode active material may be used either singly or as a mixture of two or more types of them.

Negative electrode active material: The negative electrode active material layer contains a negative electrode active material. The negative electrode active material has a composition which allows ion desorption during discharging and ion adsorption during charging. The negative electrode active material is not particularly limited as long as it allows reversible adsorption and desorption of lithium. Preferred examples of the negative electrode active material may include a carbon material such as graphite (natural graphite and artificial graphite), carbon black, activated carbon, carbon fiber, cokes, soft carbon or hard carbon; a metal such as Si or Sn; a metal oxide such as TiO, $Ti_2O_3$ and $TiO_2$ or $SiO_2$, SiO and $SnO_2$; a composite oxide of lithium and a transition metal such as $Li_{4/3}Ti_{5/3}O_4$ or $Li_7MnN$; a lithium-metal alloy material such as Li—Pb based alloy or Li—Al based alloy; and Li.

The negative electrode active material may also contain an element which forms an alloy with lithium. By using an element which forms an alloy with lithium, it is possible to obtain a battery which has a higher energy density than a conventional carbon-based material and thus exhibits a high capacity and excellent output characteristics. Specific examples of the element which forms an alloy with lithium include Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl but are not limited thereto.

Among them, the negative electrode active material preferably contains a carbon material and/or at least one or more elements selected from the group consisting of Si, Ge, Sn, Pb, Al, In and Zn from the viewpoint of constituting a battery with excellent capacity and energy density, it contains more preferably a carbon material, a material containing an element of Si or Sn. Among them, from the viewpoint of improving battery durability by forming a uniform and stable surface film, the negative electrode active material is more preferably a carbon material, and particularly preferably graphite.

The negative electrode active material may be used either singly or in combination of two or more types.

The average particle diameter of the active material is, although not particularly limited, preferably 1 to 100 μm, and more 1 to 20 μm from the viewpoint of having high capacity, reactivity, and cycle durability of the active material. When it is within the above range, an increase in internal resistance of a battery is suppressed during charging and discharging at high output conditions, and thus a sufficient amount of current can be extracted from a secondary battery. Meanwhile, when the active material is a secondary particle, it can be said that the average particle diameter of primary particle constituting the secondary particle is preferably in the range of 10 nm to 1 μm, but it is not necessarily limited thereto. Although it may vary depending on the production method, it is needless to say that the active material may not be the one which is prepared as secondary particle according to aggregation or bulking process. As for the particle diameter and primary particle diameter of the active material, median diameter obtained by laser diffraction can be used. Meanwhile, the shape of the active material may vary depending on the type, production method and so on. Examples of the shape include a sphere shape (powder shape), a plate shape, a needle shape, a column shape, and a rectangular shape, but not limited, and any of those shapes can be used without a problem. It is preferable that a shape most suitable for improving battery properties like charging and discharging property is appropriately selected.

Binder: The binder is not particularly limited and the following materials are included, for example: thermoplastic polymers such as polyethylene, polypropylene, polyethylene terephthalate (PET), polyether nitrile, polyacrylonitrile, polyimide, polyamide, cellulose, carboxymethyl cellulose (CMC), an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), an epoxy resin, and a cellulose derivative (carboxymethyl cellulose, methyl cellulose, and hydroxyethyl cellulose, and a salt thereof). Among them, more preferred are polyvinylidene fluoride, polyimide, styrene-butadiene rubber, carboxymethyl cellulose, polypropylene, polytetrafluoroethylene, polyacrylonitrile, and polyamide. Those preferred binders have excellent heat resistance and a very wide potential window, and thus they are stable under both of the positive electrode potential and negative electrode potential and can be used for an active material layer. Those binders may be used either singly or in combination of two or more types.

The amount of the binder is not particularly limited as long as the binder can bind the active material. The amount of binder is preferably 0.5 to 15% by weight relative to the solid content of the active material slurry, and more preferably 1 to 10% by weight.

Conductive aid: The conductive aid is an additive to be mixed for improving conductivity of the positive electrode active material layer or negative electrode active material layer. Examples of the conductive aid include carbon material such as carbon black like acetylene black, graphite, or carbon fiber. If the active material layer contains a conductive aid, the electron network in the inside of the active material layer is effectively formed, thereby contributing to the improvement of output characteristics of a battery.

Solvent for adjusting slurry viscosity: Examples of the solvent for adjusting slurry viscosity include N-methyl-2-pyrrolidone (NMP), dimethyl formamide, dimethyl acetamide, and methyl formamide. In addition, an aqueous solvent (water or the like) may be also used instead of the solvent for adjusting slurry viscosity (NMP or the like). In particular, as a slurry for forming the negative electrode active material, a slurry using an aqueous solvent is preferably used. As a method for preparing a negative electrode slurry using an aqueous solvent (water or the like), it is possible that an active material, an aqueous binder like SBR, CMC or CMC salt as a thickening agent, and if necessary, a conductive aid and the like are admixed with one another, and an aqueous slurry is prepared by using an aqueous solvent like water.

(2) Step for Producing Positive/Negative Electrode

According to this step, the active material slurry to be obtained is coated on a surface of a current collector followed by drying and pressing.

Slurry coating: The method for coating an active material slurry is not particularly limited, and examples of the method which may be used include a coating method using a coater and a patterning coating method such as inkjet method or screen printing coating method.

The current collector is composed of a conductive material, and a positive electrode active material layer (or, a negative electrode active material layer) is arranged on its one surface or both surfaces. The material for constituting the current collector is not particularly limited. For example, it is possible to use a metal or a resin having conductivity in which a conductive filler has been added to a conductive polymer material or a non-conductive polymer material.

As the metal, examples include aluminum, nickel, iron, stainless steel (SUS), titanium, and copper. Besides these, it is possible to preferably use, for example, a cladding material of nickel and aluminum, a cladding material of copper and aluminum, or a plating material made of a combination of these metals. It may be a foil prepared by covering the metal surface with aluminum. In particular, from the viewpoint of conductivity and battery operation potential, aluminum, stainless steel and copper are preferably used.

Furthermore, examples of the conductive polymer material include polyaniline, polypyrrole, polythiophene, polyacetylene, polyparaphenylene, polyphenylene vinylene, polyacrylonitrile, and polyoxadiazole. By having sufficient conductivity even without adding a conductive filler, those conductive polymer materials are advantageous for facilitating the production process or having light weight of a current collector.

Examples of the non-conductive polymer material include polyethylene (PE; high density polyethylene (HDPE), low density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such non-conductive polymer material can have a superior potential resistance or solvent resistance.

If necessary, it is possible to add a conductive filler to the above-mentioned conductive polymer material or non-conductive polymer material. In particular, in case that the resin as a base of the current collector is consisted of only the non-conductive polymer, the conductive filler becomes inevitably essential to provide the resin with conductivity. The conductive filler can be used without a particular limitation as long as it is a material having conductivity. For example, as a material superior in conductivity, potential resistance, or lithium ion shielding property, metals, conductive carbons and the like are included. Although the metal is not particularly limited, it is preferable to contain at least one metal selected from the group consisting of Ni, Ti, Al, Cu, Pt, Fe, Cr, Sn, Zn, In, Sb, and K, or an alloy or metal oxide containing these metals. Furthermore, although the conductive carbon is not particularly limited, it is preferable to contain at least one selected from the group consisting of acetylene black, Vulcan, black pearl, carbon nanofiber, ketjen black, carbon nanotube, carbon nanohorn, carbon nanoballoon, and fullerene. The amount of the conductive filler to be added is not particularly limited as long as it is the amount capable of providing the current collector with a sufficient conductivity. In general, it is around 5 to 35% by weight.

The size of the current collector is determined depending on the use of the battery. For example, if it is used for a large size battery in which a high energy density is required, a current collector with a large area is used. The thickness of the current collector is not particularly limited, either. However, it is generally around 1 to 100 μm.

Drying: Removal of solvent for adjusting slurry viscosity: Next, by drying a current collector coated with an active material slurry, the solvent for adjusting slurry viscosity contained in slurry coating film is removed. Conditions for drying are not limited, but it is generally 5 minutes to 20 hours at 40 to 150° C., and more preferably at 80 to 130° C. From the viewpoint of the production cost, the drying atmosphere is preferably an air atmosphere. Examples of a means (device) for drying which may be used include a drying means using vacuum drying in addition to the drying means allowing typical continuous drying, that is, a means using hot air drying or infrared ray (IR) drying. It is also possible that a drying means combining the hot air drying and IR drying is used.

It is possible that, after performing the coating and drying on one surface of a current collector, the same coating and drying are performed for the other surface of a current collector to form a dry coating film on both surfaces of a current collector. It is also possible that the coating and drying are simultaneously performed for both surfaces. Furthermore, in the case of a bipolar type electrode, it is possible that a dry coating film (positive electrode active material layer) is formed on one surface by using the above positive electrode slurry, and a dry coating film (negative electrode active material layer) is formed on the other surface by using the negative electrode slurry. Even for such case, the aforementioned coating and drying may be also performed in order for both surfaces, or simultaneously for both surfaces.

Pressing of dry coating film: Next, by pressing a current collector having a dry coating film after drying of a slurry coating film and adjusting to have target density of the slurry dry coating film (active material layer), an electrode is obtained. By using a cutting means, the electrode may be cut (tailored) to have a desired shape and size. Thickness of each active material layer is not particularly limited, and reference can be suitably made to publicly known findings that are related to a battery. For example, thickness of each active material layer is around 2 to 100 μm.

[II] Step for Forming Laminate and Encasing Laminate in Battery Outer Casing Material:

In this step [II], the positive electrode and negative electrode that are obtained from the step [I] and a separator are laminated to form a laminate, which is then encased in a battery outer casing material.

Method for forming laminate: The positive electrode and negative electrode that are obtained from the step [I] and a separator are laminated in the order of positive electrode, separator, negative electrode, separator, positive electrode, and so on. By doing so, a laminate consisting of desired lamination number (cell number) can be obtained.

Specific examples of the separator include a microporous membrane which is composed of a hydrocarbon such as polyolefin like polyethylene and polypropylene, and polyfluorovinylydene-hexafluoropropylene (PVdF-HFP), and glass fiber.

Welding of tab: Next, to the obtained laminate, a positive electrode tab and a negative electrode tab are adhered by welding. If necessary, after welding, extra tab or the like is preferably removed by trimming. The adhesion method is not particularly limited. However, a method of using an ultrasonic welding machine is favorable in that adhesion can be achieved within a very short time without having heat generation (heating) during adhesion so that deterioration of an electrode active material layer caused by heat can be prevented. In this case, the positive electrode tab and negative electrode tab may be arranged to face each other (oppositely) on the same side (the same side for leading to outside). Accordingly, the positive electrode tabs of each positive electrode can be bundled into one and led, as one positive electrode current collecting plate, from the outer casing. Similarly, the negative electrode tabs of each negative electrode can be bundled into one and led, as one negative electrode current collecting plate, from the outer casing. It is also possible that, the positive electrode current collecting plate (positive electrode current collecting tab) and the negative electrode current collecting plate (negative electrode current collecting tab) are arranged such that they are present on opposite sides (different sides for leading to outside).

The material for constituting the current collecting plate (tab) is not particularly limited, and a known material with high conductivity may be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate (tab) and the negative electrode current collecting plate (tab). Furthermore, it is also possible that the outermost layer current collector (FIGS. 1; 11a and 11b) is extended to form a current collecting plate, or a separately prepared tab is connected to the outermost layer current collector.

Furthermore, in FIG. 1, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

Encasing of laminate in outer casing material: Subsequently, the laminate is encased in an outer casing. The battery outer casing is a member for sealing a power generating element within it, and an envelope-shape case in which a laminate film containing aluminum is used for covering a power generating element can be used, for example. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. The laminate film is also preferable in that gas generated inside of a power storing element can be easily removed by applying force from the outside. The outer casing is more preferably a laminate film containing aluminum.

The laminate is inserted, from the top and bottom, between laminate films used as a battery outer casing such that the positive electrode current collecting plate (positive electrode current collecting tab) and negative electrode current collecting plate (negative electrode current collecting tab) can be led to the outside of a battery outer casing.

Production of three side sealed body: Next, the three sides of the peripheral part (sealing part) of the laminate film on the top and bottom are heat-pressed for sealing. According to sealing by heat-pressing of three sides among the peripheral part, a three side sealed body is obtained. At that time, the heat sealing part from which the positive electrode current collecting plate (positive electrode current collecting tab) and negative electrode current collecting plate (negative electrode current collecting tab) are led to the outside is preferably sealed. That is because, during liquid injection thereafter, if the positive electrode current collecting plate and negative electrode current collecting plate are present on an opening part, the electrolyte solution may be scattered or the like at the time of carrying out liquid injection.

Meanwhile, although descriptions are given above for a battery with lamination type structure, the battery configuration is not limited to the lamination type, and various shapes like rectangular shape, paper shape, column shape, and coin shape can be employed.

[III] Step for Injecting Electrolyte Solution to Laminate:

According to this step, an electrolyte solution as an electrolyte is injected to a laminate. After encasing, by sealing three sides of an encasing body, a three side sealed body is formed. Furthermore, through an opening on the remaining one side of the three side sealed body, the electrolyte solution is injected.

Liquid injection: Next, through an opening on the remaining one side of the three side sealed body, the electrolyte solution is injected with a liquid injection device to the inside of the three side sealed body. Accordingly, an electrolyte layer having an electrolyte impregnated in a separator is formed. At that time, to have the impregnation of an electrolyte as soon as possible in the laminate inside the three side sealed body, in particular, in the separator and electrode active material layer, the three side sealed body is preferably placed in a vacuum box connected to a vacuum pump. It is also preferable that the liquid injection is performed after the inside is prepared to be in high vacuum state by de-pressurization. After the liquid injection, the three side sealed body is taken out from the vacuum box, and the remaining one side of the three side sealed body is temporarily sealed to obtain a non-aqueous electrolyte secondary battery of lamination type (lamination structure).

Electrolyte solution: The electrolyte solution is an electrolyte in liquid phase, and it contains an electrolyte salt, a non-aqueous solvent capable of dissolving an electrolyte salt, and plural additives. Since the electrolyte solution has higher lithium ion conductivity compared to a solid, it can provide a battery with high output performance.

Examples of the non-aqueous solvent include dimethyl carbonate (DMC), diethyl carbonate (DEC), dipropyl carbonate (DPC), ethylmethyl carbonate (EMC), methyl propionate (MP), methyl acetate (MA), methyl formate (MF), 4-methyldioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC), and γ-butyrolactone (GBL). Among them, dimethyl carbonate (DMC), diethyl carbonate (DEC), dipropyl carbonate (DPC), ethylmethyl carbonate (EMC), ethylene carbonate (EC), propylene carbonate (PC), and butylene carbonate (BC) are preferable. From the viewpoint of having continuous film forming, the non-aqueous solvent preferably contains ethylene carbonate. When the solvent contains ethylene carbonate, content of the ethylene carbonate is, relative to 100% by volume of the non-aqueous solvent, preferably 5 to 60% by volume, and more preferably 20 to 45% by volume.

As described herein, the additive indicates a material which has oxidation/reduction and decomposition potential, and has content of less than 5% by weight relative to 100% by total weight of an electrolyte salt, a non-aqueous solvent, and additives. Thus, the additive may be also referred to as a reduction and decomposition type additive for forming SEI film. Accordingly, even for a solvent capable of dissolving the electrolyte salt, if the content is less than 5% by weight, it corresponds to an additive. Meanwhile, the lower limit of the content of each additive is more than 0% by weight. However, considering the effect of the addition, it is preferably 0.1% by weight or more, and more preferably 0.5% by weight or more.

The additive preferably has, as reduction and decomposition potential, a potential which is nobler than 0.2 V (vs Li/Li$^+$) from which intercalation of lithium ions toward negative electrode active material (particle) starts. When it is 0.2 V or less relative to lithium metal and lithium ions start to intercalate toward a negative electrode active material (particle) like graphite, the reactivity of a negative electrode also increases rapidly. In addition, the lithium ions that are solvated with solvent molecules in an electrolyte solution become de-solvated when they intercalate toward a negative electrode active material (particle) like graphite. In that case, if the quality of the film (SEI) is poor, the de-solvation reaction does not occur smoothly so that the battery properties may be deteriorated or deterioration like peeling of the surface layer of a negative electrode active material (particle) like graphite may occur. Thus, the additive preferably has, as reduction and decomposition potential, at least a potential which is nobler than 0.2 V from which intercalation of lithium ions toward negative electrode active material (particle) starts.

In the present embodiment, plural additives (two or more kinds) are used. The upper limit of the type of additives that are used is, although not particularly limited, preferably 4 kinds or less, more preferably 3 kinds or less, and even more preferably 2 kinds considering the effect of a SEI film.

Among the additives, at least one has a reduction potential which is nobler than the reduction potential of all solvents of a non-aqueous electrolyte secondary battery. In particular, the additive having the noblest reduction potential is decomposed during the first charging step which is described below.

Herein, as for the additive having the noblest reduction potential, from the viewpoint of improving the durability of a battery by forming a compact and dense film, it is a compound represented by the following Formula (1):

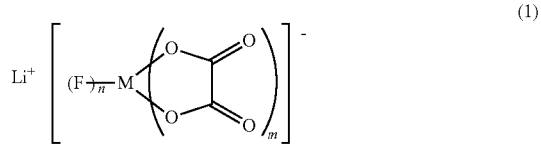

(1)

that is, an oxalate compound.

In Formula (1), M represents phosphorus or boron. n represents an integer of from 0 to 4. m represents an integer of from 1 to 3, and it is preferably 1 or 2. When M is phosphorus, 2m+n=6. When M is boron, 2m+n=4.

The preferable examples of the oxalate compound represented by the above Formula (1) include lithium tetrafluorooxalate phosphate (Compound (1) shown below), lithium difluorooxalate borate (Compound (4) shown below), lithium bisoxalate borate (Compound (3) shown below), and lithium difluorobisoxalate phosphate (Compound (2) shown below). Namely, the oxalate compound is preferably at least one kind selected from a group consisting of lithium tetrafluorooxalate phosphate, lithium difluorooxalate borate, lithium bisoxalate borate, and lithium difluoro bisoxalate phosphate.

TABLE 1

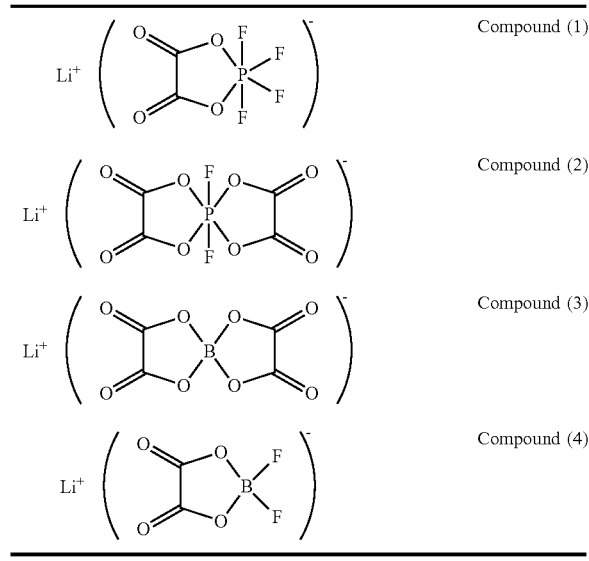

| | |
|---|---|
| | Compound (1) |
| | Compound (2) |
| | Compound (3) |
| | Compound (4) |

Alternatively, like the compound represented by Formula (1), from the viewpoint of improving the durability of a battery by forming a compact and dense film, the additive having the noblest reduction potential is preferably a compound represented by the following Formula (2):

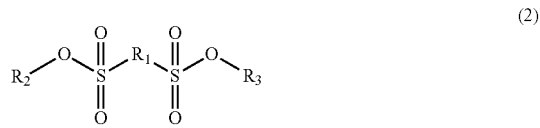

(2)

that is, a disulfonic acid ester compound.

In Formula (2), $R_1$ represents a substituted or unsubstituted alkylene group with 1 to 3 carbon atoms, or a substituted or unsubstituted polyfluoroalkylene group with 1 to 3 carbon atoms, $R_2$ and $R_3$ each independently represent a substituted or unsubstituted alkyl group with 1 to 4 carbon atoms, or a substituted or unsubstituted polyfluoroalkyl group with 1 to 4 carbon atoms, and $R_2$ and $R_3$ may bind with each other to form a ring, and in the case of forming a ring, $R_2$ may be a corresponding alkylene group and $R_3$ may be a single bond.

Examples of the alkylene group as $R_1$ include a methylene group, an ethylene group, and a propylene group. A methylene group is preferable. Examples of the polyfluoroalkylene group as $R_1$ include an alkylene group of which at least one hydrogen atom is replaced with a fluorine atom, and specific examples thereof include —CHF—, —CH$_2$CF$_2$—, —CF$_2$CH$_2$CF$_2$—, —CH(CF$_3$)CF$_2$—, and —CH$_2$CF (CF$_3$)—.

Examples of the substituent group for $R_1$ which may be present depending on a case include an alkyl group with 1 to 3 carbon atoms (methyl group, ethyl group, n-propyl group, and isopropyl group), an alkyl group substituted with fluorine having 1 to 3 carbon atoms, a vinyl group, and a fluorine atom.

Examples of the alkyl group with 1 to 4 carbon atoms as $R_2$ and $R_3$ include a methyl group, an ethyl group, an n-propyl group, an isopropyl group, an n-butyl group, an isobutyl group, a sec-butyl group, and a tert-butyl group. Examples of the polyfluoroalkyl group as $R_2$ and $R_3$ include the above-mentioned alkyl group of which at least one hydrogen atom is replaced with a fluorine atom, and specific examples thereof include a 2,2-difluoro-n-propyl group.

Examples of the substituent group for $R_2$ and $R_3$ which may be present depending on a case include a vinyl group and a carbonyl group.

Examples of the compound represented by the above Formula (2) include the following Compound (5) to (19).

TABLE 2

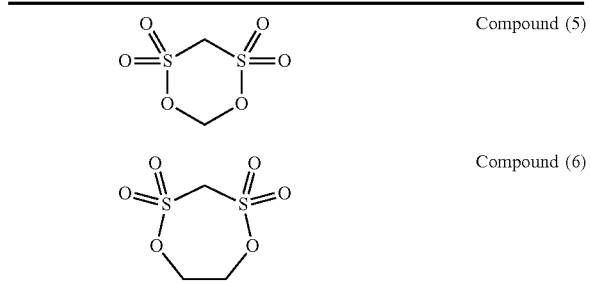

| | |
|---|---|
| | Compound (5) |
| | Compound (6) |

TABLE 2-continued

| | |
|---|---|
| 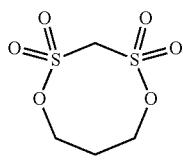 [SMILES: O=S1(=O)CS(=O)(=O)OCCCO1] | Compound (7) |
| 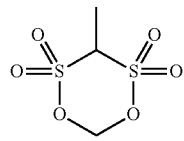 | Compound (8) |
| 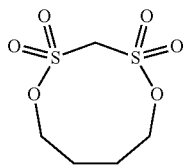 [SMILES: O=S1(=O)CS(=O)(=O)OCCCCO1] | Compound (9) |
| 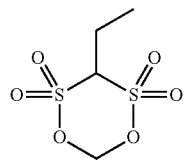 | Compound (10) |
| 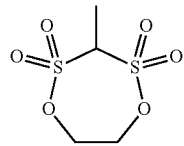 | Compound (11) |
| 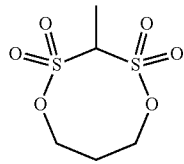 | Compound (12) |
| 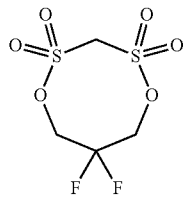 [SMILES: O=S1(=O)CS(=O)(=O)OCC(F)(F)CO1] | Compound (13) |

TABLE 3

| | |
|---|---|
| 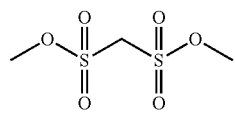 | Compound (14) |
| 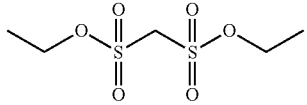 | Compound (15) |

TABLE 3-continued

| | |
|---|---|
| 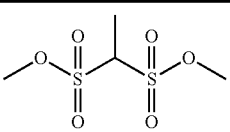 | Compound (16) |
| 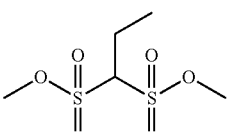 | Compound (17) |
| 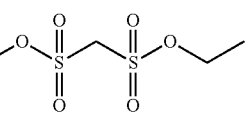 | Compound (18) |
| 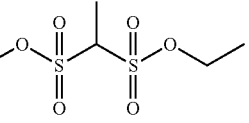 | Compound (19) |

Among the compounds that are represented by the above Formula (2), methylene methane disulfonate (Compound (5)), ethylene methane disulfonate (Compound (6)), propylene methane disulfonate (Compound (7)), dimethylmethane disulfonate (Compound (14)), diethylmethane disulfonate (Compound (15)), and ethylmethylmethane disulfonate (Compound (18)) are preferable from the viewpoint of forming a film. Namely, the disulfonic acid ester compound is preferably at least one selected from a group consisting of methylene methane disulfonate, ethylene methane disulfonate, propylene methane disulfonate, dimethylmethane disulfonate, diethylmethane disulfonate, and ethylmethylmethane disulfonate.

The oxalate compound and disulfonic acid ester compound may be used either singly or in combination of two or more types. Namely, the additive having the noblest reduction potential is preferably at least one kind selected from a group consisting of the oxalate compound represented by Formula (1) and the disulfonic acid ester compound represented by Formula (2). When several of them are used in combination, the compound decomposed during the first charging step is an additive having the noblest reduction potential, and other compounds are an additive which is added in addition to the additive having the noblest reduction potential (hereinbelow, also referred to as "other additive").

The concentration of the additive having the noblest reduction potential in an electrolyte is not particularly limited. However, relative to 100% by weight of an electrolyte, it is preferably 0.5 to 3.5% by weight, and more preferably 1 to 3% by weight. As the additive having the noblest reduction potential is present at 0.5% by weight or more, a film can be sufficiently formed on a surface of an electrode. Furthermore, as it is present at 3.5% by weight or less, an increase in initial resistance caused by film forming is suppressed so that a uniform film can be formed in an electrode surface.

In addition to the oxalate compound/disulfonic acid ester compound, other additive other than the additive having the noblest reduction potential is not particularly limited. In particular, it preferably contains at least one kind selected from a group consisting of vinylene carbonate, fluoroethylene carbonate, vinylethylene carbonate, 1,3-propanesultone, 1,4-butanesultone, 1,3-propenesultone, succinonitrile, and adiponitrile. By combining an additive having the noblest reduction potential with other additive, a stable film with lamination structure is formed so that a battery with further improved durability can be obtained. The concentration of other additive in an electrolyte is not particularly limited. However, relative to 100% by weight of an electrolyte, it is preferably 0.1% by weight or more and less than 5% by weight, and more preferably 1 to 4% by weight considering the effect of addition and an increase in resistance. In addition, it is preferable that at least one, and preferably all reduction potentials of other additives have a potential which is nobler than the non-aqueous solvent which has the noblest reduction potential and undergoes reduction and decomposition during the second charging step. By having such reduction potential, the additive undergoes reduction and decomposition before decomposition of a non-aqueous solvent so that a dense and stable film (SEI) may be formed on a surface of an active material. Furthermore, since the SEI film of other additive which is formed during the second charging step does not provide a mixed film with an additive which is decomposed at the noblest reduction potential, the intrinsic activities of other additive may be easily exhibited.

The electrolyte salt (lithium salt) is not particularly limited, and examples thereof include an inorganic acid anion salt such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, or LiSCN and an organic acid anion salt such as $LiCF_3SO_3$, $Li(CF_3SO_2)_2N$, LiBOB (lithium bisoxide borate), and LiBETI (lithium bis(perfluoroethylene sulfonylimide); also referred to as $Li(C_2F_5SO_2)_2N)$. The electrolyte salt may be used either singly or in the form of a mixture of two or more types. The concentration of a supporting salt in an electrolyte is not particularly limited. However, relative to the total amount of the supporting salt and non-aqueous solvent, it is preferably 0.5 to 2 mol/L.

Initial Charging Step:

Initial charging is performed for an uncharged non-aqueous electrolyte secondary battery (electrode assembled product) obtained from above. In the present embodiment, the initial charging includes a charging step with at least two stages, and it preferably includes a charging step with at least three stages. More preferably, it includes a gas releasing step after the second charging step.

Figure 2:
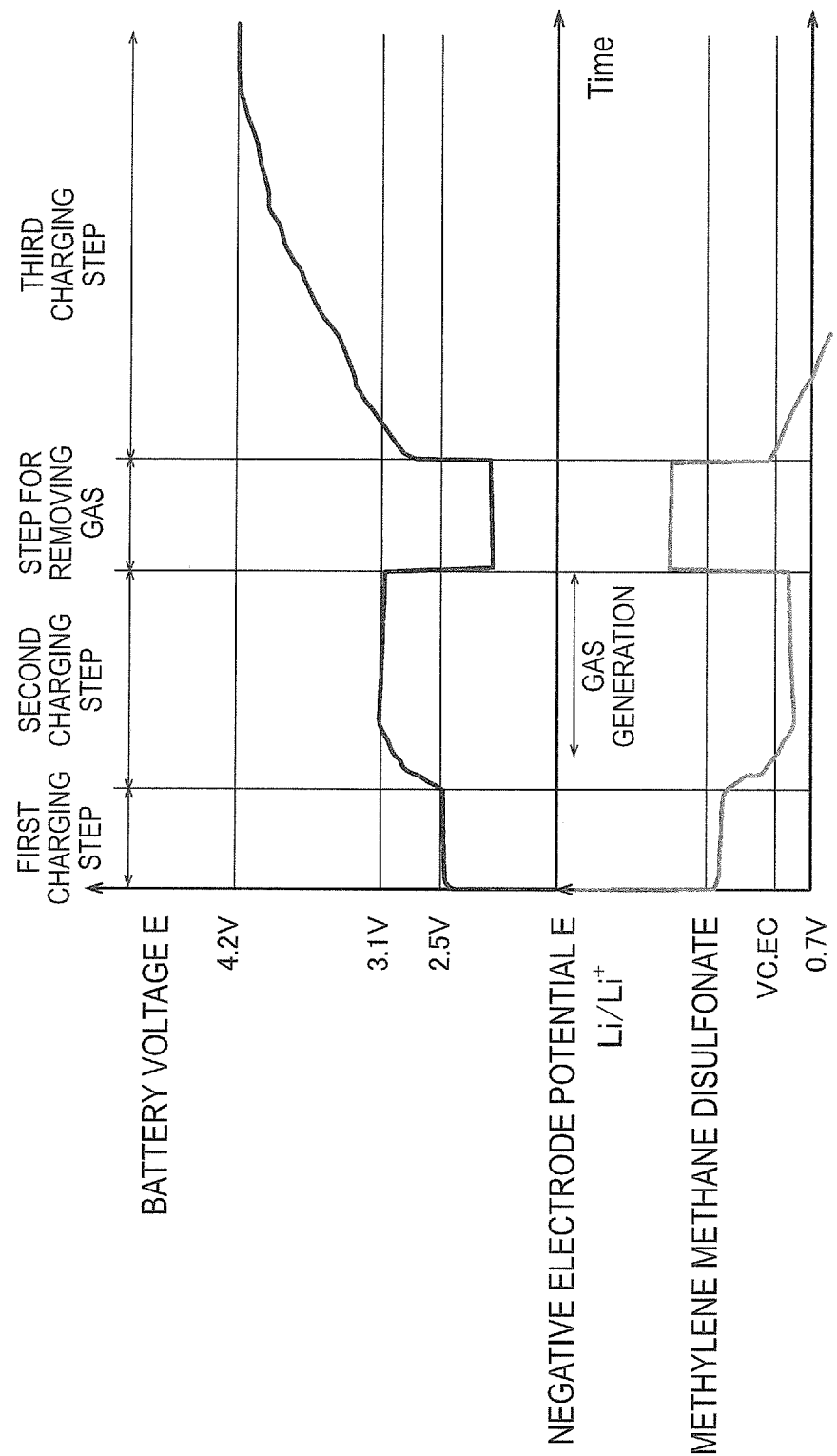
FIG. 2 is an explanatory drawing illustrating the time and voltage relationship of an initial charging process.

FIG. 2 is an explanatory drawing illustrating the time and voltage relationship of an initial charging process. The battery voltage-time drawing is given in the top and the corresponding negative electrode potential-time drawing is given in the bottom. Meanwhile, the explanatory drawing of FIG. 2 is only to facilitate the understanding of the present embodiment, and it is not an actual measurement drawing of the examples that are described below. Furthermore, the present invention is not limited by the drawing at all. In FIG. 2, a case in which methylene methane disulfonate and vinylene carbonate (in FIG. 2, VC) are used as an additive and ethylene carbonate (in FIG. 2, EC) is used as a non-aqueous solvent is given as an example. During the first charging step, charging is performed at potential at which only methylene methane disulfonate having the noblest reduction potential is decomposed. In FIG. 2, the sustain voltage for the first charging step is 2.5 V. Subsequently, during the second charging step, charging is performed at a potential at which ethylene carbonate is decomposed. Herein, in conjunction with decomposition of ethylene carbonate, gas is generated. Furthermore, since vinylene carbonate has nobler reduction potential than ethylene carbonate, the vinylene carbonate is also decomposed during the second charging step. In FIG. 2, the sustain voltage for the second charging step is 3.1 V. After the second step, a gas releasing step for removing gas is performed. Subsequently, by performing the third charging step, the battery is fully charged (in FIG. 2, battery voltage of 4.2 V). Hereinbelow, descriptions are given for each step.

[I] First Charging Step:

According to the first charging step, reduction and decomposition of an additive which is decomposed at the noblest reduction potential occurs, and film forming proceeds with the reduction and decomposition product.

When there are plural additives and the charging step is performed without considering reduction potential of each additive, a coating film of a mixture of additives is formed. If the coating film has non-uniform components, a performance supposed to be exhibited by each component may not be shown.

According to the first charging step in the present embodiment, however, only an additive which is decomposed at the noblest reduction potential undergoes the reduction and decomposition, and no other electrochemical reaction occurs. As such, a uniform film with fewer defects can be formed.

During the first charging step, the battery voltage is maintained at a negative electrode potential at which an additive having the noblest reduction potential decomposes while the non-aqueous solvent and other additives do not undergo reduction and decomposition. By maintaining the battery voltage for a certain period of time, forming of a SEI film with an additive having the noblest reduction potential sufficiently progresses. The charging time for the first charging step is suitably set depending on the type and addition amount of an additive or the like. It is preferably 0.3 to 5 hours or so, and more preferably 0.5 to 1 hour. When it is within this range, the battery voltage can be maintained at constant level. The battery voltage can be maintained by constant voltage charging.

It is preferable that the first charging step is performed by constant current and constant voltage charging. Furthermore, according to constant voltage charging, the current amount is reduced such that the cell voltage does not exceed the corresponding constant voltage, and it is preferable to perform the constant voltage charging until the current value is less than 0.01 C. According to such mode, the electricity amount required for advancing a sufficient reaction of the additive inside a battery, in which the additive undergoes reduction and decomposition at the noblest potential, can be supplied within a short time. Thus, deterioration of the durability which is caused by a side reaction of residual additive is prevented so that the addition amount required for improving the performance can be reduced.

The charging current at the constant current charging stage of the first charging step is preferably 0.01 to 5 C, and more preferably 0.02 to 2 C. As described herein, C indicates a current value for discharging the negative electrode theoretical capacity (initially charged capacity when the counter electrode is lithium) to the end in an hour. The negative electrode theoretical capacity indicates capacity which is obtained by performing constant current charging with extremely low current value (current value requiring 20 hours or so to have 0 V), and after having the end voltage of 0 V, performing charging till to have a current value of 0.1 mA or less.

After constant current charging, constant voltage charging is performed. Herein, the voltage for constant voltage charging is set to have a negative electrode potential at which the additive having the noblest reduction potential among additives is decomposed while the non-aqueous solvent and other additives do not experience reduction and decomposition. As such, the voltage for constant voltage charging is suitably set considering the reduction and decomposition potential of the additives and non-aqueous solvent that are contained.

[II] Second Charging Step:

After the first charging step, the second charging step is performed. During the second charging step, the battery voltage is maintained at voltage at which at least one non-aqueous solvent is decomposed and non-aqueous solvent is decomposed. Accordingly, gas generation originating from the non-aqueous solvent fully progresses during this step, and thus the gas generation can be suppressed during the following step. Namely, as the gas is allowed to be generated sufficiently during the second charging step, gas generation thereafter can be minimized as much as possible.

Charging time for the second charging step is suitably determined depending on the type, addition amount, or the like of an additive. It is preferably 0.3 to 8 hours or so, and more preferably, it is 0.5 to 1 hour. When it is within the aforementioned range, the battery voltage can be maintained at constant level. The battery voltage can be maintained by constant voltage charging.

Furthermore, according to the second charging step, a SEI film based on decomposition product of a solvent like ethylene carbonate is formed on a SEI film formed during the first charging step, and as a result, it is expected to form SEI with lamination structure. Furthermore, due to an occurrence of the solvent decomposition involved with gas generation, the film to be formed in the second charging step is rather loose, and thus the ion conductivity is not likely to be interfered by a film on the outer side. For such reasons, even with a film with lamination structure, a film with high ion conductivity is formed.

Furthermore, during the second charging step, the battery voltage is maintained such that the negative electrode potential is 0.7 V or higher relative to lithium. According to control to have negative electrode potential of not less than 0.7 V relative to lithium, a non-uniform reaction on an electrode, which is caused by lithium insertion and desorption reaction of an active material in a state of having gas generated in an electrode laminate, can be prevented so that a battery with high durability can be obtained. The negative electrode potential of 0.7 V relative to lithium in the second charging step indicates a voltage value which is obtained as a value that is less noble than the reduction and decomposition peak of a solvent in cyclic voltammogram and at which a potential nobler than the reaction between lithium ion and negative electrode active material does not occur. The upper limit of the negative electrode potential which is maintained during the second charging step is, although not particularly limited, generally 1.5 V or less, and preferably 1.0 V or less.

The second charging step is preferably performed at constant current and constant voltage charging. Furthermore, according to the constant voltage charging, the current amount is reduced such that the cell voltage does not exceed the corresponding constant voltage, and it is preferable to perform the constant voltage charging till to have a current value of less than 0.01 C. According to such mode, it becomes possible that the reaction of a solvent or additives other than the additive having the noblest reduction potential proceeds efficiently, and the amount of gas generated during following steps can be minimized.

The charging current at the constant current charging stage of the second charging step is preferably 0.01 to 5 C, and more preferably 0.02 to 2 C.

The constant current charging is carried out till to have the upper limit voltage. The upper limit voltage indicates negative electrode voltage at which at least one kind of the non-aqueous solvents is reduced and decomposed.

After the constant current charging, constant voltage charging is performed at the aforementioned upper limit voltage. Herein, the voltage for constant voltage charging is set so that the voltage is voltage at which at least one of the non-aqueous solvents is reduced and decomposed and the negative electrode potential is 0.7 V or higher relative to lithium. As such, the voltage for constant voltage charging is suitably set considering the reduction and decomposition potential of the non-aqueous solvent to be contained.

[III] Step for Removing Gas:

It is preferable to have, after the second charging step, a step for removing gas from a power generating element. According to the reduction and decomposition reaction of a non-aqueous solvent like ethylene carbonate, a SEI film is formed with gas generation, and the gas generation is continued until the solvent decomposition reaction rate becomes sufficiently slow. Although a great amount of the gas generated between electrodes can be released to the outside of the battery laminate by maintaining the potential till to have sufficiently slow gas generation rate, by adding a step for further gas removal, the lithium insertion can be more evenly carried out during the following charging step. As such, the durability is improved more. In a laminate battery, in particular, a significantly improved durability can be obtained by having the aforementioned step for removing gas. Meanwhile, for a battery under constant pressure like can type battery, it is not always necessary to perform the gas releasing step during manufacture.

The method for gas removal is, although not particularly limited, preferably performed by applying mechanical force from the outside of a battery so that the gas present in a power generating element is pushed out to a peripheral region inside the battery. Furthermore, the step for applying mechanical force from the outside of a battery to push out the gas present in a power generating element to a peripheral region inside the battery is preferably a step of applying pressure to a plate shape battery by using a roller. With such step, the gas present in a power generating element can be released to a space which is present between the power generating element and an outer casing.

[IV] Third Charging Step:

The production method of the present invention preferably has a further third charging step after the step for removing gas from a power generating element. According to the step for removing gas, gas present between the electrodes and in the peripheral region of the electrode is removed so that more uniform resistance between electrodes can be obtained. By performing a charging step subsequently, a deviation in charging state in the electrode can be reduced. It is known that, although it may be little, some amount of the lithium ion secondary battery active material experiences a volume change during charging and discharging. Since the stress occurring in the electrode can be reduced by decreasing a deviation in charging state in the electrode, a battery with higher durability can be obtained. This effect is particularly effective for a lithium ion secondary battery with a laminate outer casing which has a structure in which the electrode body is pressurized at atmospheric pressure.

The third charging step is preferably performed by constant current and constant voltage charging. The charging current at the constant current charging stage of the third charging step is preferably 0.01 to 5 C, and more preferably 0.02 to 2 C. The constant current charging is performed till to have the upper limit voltage. Preferably, it is performed till to have full charging. The constant voltage charging is preferably performed after that.

The charging time for the third charging step is suitably set, and it is preferably 2 to 24 hours, and more preferably 3 to 12 hours.

Hereinabove, descriptions are given for the method for producing a non-aqueous electrolyte secondary battery in which the electrolyte as one preferred embodiment of the present invention is used as an electrolyte solution. However, as an electrolyte, a gel electrolyte having an electrolyte solution and a host polymer for supporting the electrolyte solution can be also used. The gel electrolyte can prevent liquid leakage from a battery, and thus is expected to have high safety. Examples of the host polymer include a polymer having polyethylene oxide in a main chain or a side chain (PEO), a polymer having polypropylene oxide in a main chain or a side chain (PPO), polyethylene glycol (PEG), polyacrylonitrile (PAN), polymethacrylic acid ester, polyvinylidene fluoride (PVdF), a copolymer of polyvinylidene fluoride and hexafluoropropylene (PVdF-HFP), polyacrylonitrile (PAN), poly(methylacrylate) (PMA), and poly(methylmethacrylate) (PMMA). It is also possible to use a mixture, a modified product, a derivative, a random copolymer, an alternating copolymer, a graft copolymer, a block copolymer or the like of the above polymer. According to forming of a cross-linked structure, the host polymer can exhibit excellent mechanical strength. To form a cross-linked structure, by using a suitable polymerization initiator, a polymerization treatment such as heat polymerization, ultraviolet ray polymerization, radiation polymerization, or electronic beam polymerization can be performed for a polymerizable polymer for forming a high molecular weight electrolyte (for example, PEO and PPO).

Assembled Battery:

The non-aqueous electrolyte secondary battery produced by this embodiment can be also provided as an assembled battery. An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

The non-aqueous electrolyte secondary battery produced by this embodiment can maintain discharge capacity even when it is used for a long period of time, and thus has good cycle characteristics. It also has high volume energy density. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. As such, the non-aqueous electrolyte secondary battery can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the non-aqueous electrolyte secondary battery produced by this embodiment, a battery with excellent long term durability, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

The effect of the present invention is described in view of Examples and Comparative Examples that are described below. Unless specifically described otherwise, each operation is performed at room temperature (25° C.).

Measurement of Reduction Potential:

The reduction potential is obtained based on cyclic voltanogramm which is measured by cyclic voltammetry. Specifically, to a non-aqueous solvent in which ethylene carbonate (EC) and diethyl carbonate (DEC) are admixed with each other at EC/DEC=1/1 (volume ratio), $LiPF_6$ as an electrolyte salt was dissolved to have the concentration of 1 M to prepare an electrolyte solution. Then, by adding 1% by weight of an additive relative to 100% by weight of the electrolyte solution, an electrolyte solution with additive (non-aqueous solvent) is prepared. Next, by adding the electrolyte solution to a three-electrode type cell having the graphite negative electrode as a working electrode and lithium metal as a counter electrode and counter electrode, an electrochemical battery is provided. Then, the potential of the working electrode is changed at scanning rate of 0.1 mV/sec from the open circuit potential to less noble potential, and the current value at that time is measured. The measurement value obtained by using an electrolyte solution not containing an additive is used as a blank, and among the reduction and decomposition peaks that are characteristically observed after adding additives, the potential of the noblest peak is used as the reduction potential of an additive.

Example 1

(1) Production of Positive Electrode

Lithium nickel manganese cobalt oxide (95% by weight) as a positive electrode active material, PVdF (2.5% by weight) as a binder, and carbon black (2.5% by weight) as a conductive aid were admixed with one another. The mixture was dispersed in NMP to give a slurry. The obtained slurry was coated on both surfaces of an aluminum foil (thickness of 20 μm) followed by drying to obtain a positive electrode. Thickness of the positive electrode active material layer after drying was 80 µm.

(2) Production of Negative Electrode

Graphite (96% by weight) as a negative electrode active material, SBR (0.5% by weight) and CMC (1.5% by weight) as a binder, and carbon black (2% by weight) as a conductive aid were dispersed in water to give a slurry. The obtained slurry was coated on both surfaces of a copper foil (thickness of 10 µm) followed by drying to obtain a negative electrode. Thickness of the negative electrode active material layer after drying was 90 µm.

(3) Assembly of Uncharged Non-Aqueous Electrolyte Secondary Battery

Next, by laminating the above positive electrode and negative electrode sandwiched with porous polypropylene film separators (23 pieces of positive electrode, 24 pieces of negative electrode, and 46 pieces of separator), a power generating element with lamination structure was formed. After a tab for taking out the current was welded onto the power generating element, the power generating element was then wrapped with an aluminum laminate film. The tab part was taken out to the outside, and while putting aside the no melt-fusion side, the peripheral part was sealed by heat melt-fusion to obtain a battery structure before liquid injection.

By using a mixture of ethylene carbonate and diethyl carbonate (30/70 (volume ratio)) as a mixture solvent, and $LiPF_6$ as an electrolyte salt, and dissolving the electrolyte salt in the mixture solvent to have the supporting salt concentration of 1 mol/L, a mixture solution was obtained. After that, by adding, as an additive relative to 100% by weight of the mixture solution, 2% by weight of vinylene carbonate (VC) and 2% by weight of methylene methane disulfonate of the following formula, an electrolyte solution with added additives was obtained:

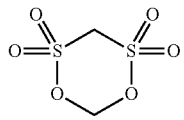

The electrolyte solution in an amount for fully wetting the lamination element in an electrolyte solution was added to the above battery structure before liquid injection, and by melt sealing the periphery, a lamination type secondary battery with external laminate was obtained.

(4) Initial Charging and Step for Removing Gas

The initial charging was performed by constant current and constant voltage charging with three divided stages. As for the determination of the completion of each charging stage, an end time point was one of the point at which the current value is lowered to 5% of the prescribed current value or the pre-set time, whichever comes first.

(4-1) First Charging Step:

The initial charging was performed by constant current charging for 30 minutes at 0.1 C from open circuit potential to battery voltage of 2.5 V.

During this step, decomposition of methylene methane disulfonate occurs but decomposition of other additives or solvent does not occur. Thus, it becomes possible to form uniformly a film derived from methylene methane disulfonate on a negative electrode.

(4-2) Second Charging Step:

Next, the second charging was performed by constant current and constant voltage charging for 30 minutes at 0.1 C to 3.1 V.

(4-3) Step for Removing Gas:

Next, the side surfaces of the battery were pressed by using a roller to push out gas from the battery laminate to the peripheral part.

(4-4) Third Charging Step:

Next, the third charging was performed by constant current and constant voltage charging for 6 hours and 30 minutes at 0.2 C to 4.2 V.

Meanwhile, the sustain voltage of 2.5 V and 3.1 V for the first and second charging steps may vary depending on a positive electrode material, a negative electrode material, an electrolyte solution, additives for electrolyte solution, and also battery design, and it is not limited to above voltage values.

Furthermore, measurement of negative electrode potential at each battery voltage was performed while it is charged at 0.1 C by using the three-electrode battery with a lithium electrode added. As a result, the negative electrode potential at the battery voltage of 2.5 V during initial charging was 1.3 V relative to lithium metal, and the negative electrode potential was 0.8 V at the battery voltage of 3.1 V.

As for the reduction potential of a material used in this example, methylene methane disulfonate was 1.5 V, vinylene carbonate was 1.15 V, ethylene carbonate was 0.9 V, and diethyl carbonate was 0.3 V.

Example 2

A battery was fabricated in the same manner as Example 1 except that, as an additive for electrolyte solution, lithium tetrafluorooxalate phosphate (reduction potential of 1.6 V) shown below is used instead of methylene methane disulfonate:

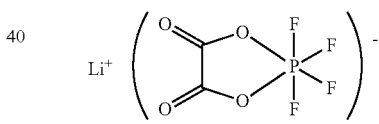

Evaluation was then made.

Example 3

A battery was fabricated in the same manner as Example 1 except that the sustain voltage of the first charging step is set at 2.3 V (negative electrode potential relative to lithium metal, 1.3 V), and then evaluation was made.

Example 4

A battery was fabricated in the same manner as Example 1 except that, as a positive electrode active material, a mixture of lithium manganese spinel and lithium nickel manganese cobalt oxide (lithium manganese spinel:lithium nickel manganese cobalt oxide=50:50 (weight ratio)) is used instead of lithium nickel manganese cobalt oxide, and then evaluation was made.

Comparative Example 1

A battery was fabricated in the same manner as Example 1 except that the sustain voltage of the first charging step is set at 3.8 V (negative electrode potential relative to lithium metal, 0.2 to 0.1 V) and the second charging step is not performed, and then evaluation was made.

Comparative Example 2

A battery was fabricated in the same manner as Example 1 except that the sustain voltage of the second charging step is set at 3.8 V (negative electrode potential relative to lithium metal, 0.2 to 0.1 V), and then evaluation was made.

Comparative Example 3

A battery was fabricated in the same manner as Example 4 except that the sustain voltage of the first charging step is set at 3.8 V (negative electrode potential relative to lithium metal, 0.2 to 0.1 V) and the second charging step is not performed, and then evaluation was made.
Items for Evaluation:
(Evaluation of Non-Uniform Property of Electrode)
After the initial charging step, the battery in fully charged state was stored for 2 weeks at room temperature. Next, the battery in discharge state with discharge rate of 0.2 C was disassembled in an inert atmosphere, and the negative electrode was taken out. Next, the obtained negative electrode was cleaned with diethyl carbonate followed by drying to obtain a cleaned negative electrode. Under a lamp, the electrode was observed with a naked eye and then the non-uniform property on a surface was determined. In an electrode having a uniform electrochemical reaction occurred therein, non-uniform color was not shown on the surface that is opposite to the positive electrode. However, if a non-uniform reaction occurs on an electrode, numerous color non-uniformities with island shape having a size of several millimeters to several centimeters were shown. When such color non uniformity is shown, it was found that the electrode reaction occurs in a non-uniform manner.
Storage Evaluation:
After charging to 4.2 V, storage was made for 112 days in an environment of 45° C. By performing DC pulse charging and discharging for 20 seconds before and after the storage, the internal battery resistance was obtained. The resistance increase rate was calculated as follows: [Resistance increase rate]=[Resistance after storage]/[Initial resistance].

The results are shown in the following Table 4.

TABLE 4

| | Type of additives | Type of positive electrode active material | End voltage of first charging step | End voltage of second charging step | Step for removing gas after second charging | Electrode non-uniformity after initial charging and discharging | Resistance increase rate after storage |
|---|---|---|---|---|---|---|---|
| Example 1 | Methylene methane disulfonate + VC | Lithium nickel manganese cobalt oxide | 2.5 V | 3.1 V | Roll treatment | No | 1.03 Times |
| Example 2 | Lithium tetrafluorooxalate phosphate + VC | Lithium nickel manganese cobalt oxide | 2.5 V | 3.1 V | Roll treatment | No | 1.05 Times |
| Example 3 | Methylene methane disulfonate + VC | Lithium nickel manganese cobalt oxide | 2.3 V | 3.1 V | Roll treatment | No | 1.04 Times |
| Example 4 | Methylene methane disulfonate + VC | Lithium manganese spinel + Lithium nickel manganese cobalt oxide | 2.5 V | 3.1 V | Roll treatment | No | 1.08 Times |
| Comparative Example 1 | Methylene methane disulfonate + VC | Lithium nickel manganese cobalt oxide | 3.8 V | None | Roll treatment | Yes | 1.16 Times |
| Comparative Example 2 | Methylene methane disulfonate + VC | Lithium nickel manganese cobalt oxide | 2.5 V | 3.8 V | Roll treatment | Yes | 1.12 Times |
| Comparative Example 3 | Methylene methane disulfonate + VC | Lithium manganese spinel + Lithium nickel manganese cobalt oxide | 3.8 V | None | Roll treatment | Yes | 1.17 Times |

From the above result, it was shown that, compared to the non-aqueous electrolyte secondary battery of Comparative Examples 1 to 3, the non-aqueous electrolyte secondary battery of Examples 1 to 4 have a uniform reaction inside the battery, and thus an increase in internal resistance after storage for a long period of time is suppressed. Accordingly, it was found to be a battery with high long term durability.

The invention claimed is:

1. A method for producing a non-aqueous electrolyte secondary battery comprising a positive electrode, a negative electrode, and an electrolyte containing an electrolyte salt, a non-aqueous solvent capable of dissolving the electrolyte salt, and plural additives, wherein at least one of the additives has a reduction potential that is nobler than the reduction potential of the non-aqueous solvent, the method comprising:

an initial charging step including a first charging step for maintaining battery voltage at a negative electrode potential at which an additive having a noblest reduction potential of the additives is decomposed while the non-aqueous solvent and other additives are not reduced and decomposed;

a second charging step for maintaining battery voltage so as to have reduction and decomposition of at least one of the non-aqueous solvents and bring the electrical potential of the negative electrode to at least 0.7 V relative to lithium, wherein the additive having the noblest reduction potential is at least one selected from a group consisting of an oxalate compound represented by the following Formula (1):

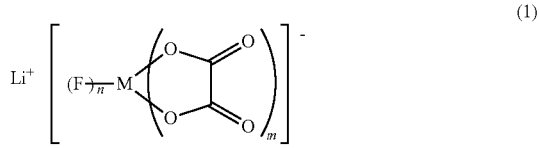

wherein M represents phosphorus or boron, n represents an integer from 0 to 4, and m represents an integer from 1 to 3, and when M is phosphorus, 2m+n=6, and when M is boron, 2m+n=4), and a disulfonic acid ester compound represented by the following Formula (2):

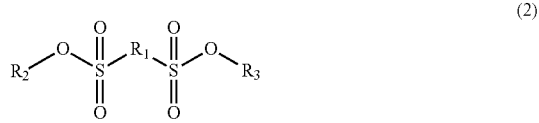

wherein $R_1$ represents a substituted or unsubstituted alkylene group with 1 to 3 carbon atoms, or a substituted or unsubstituted polyfluoroalkylene group with 1 to 3 carbon atoms, $R_2$ and $R_3$ each independently represent a substituted or unsubstituted alkyl group with 1 to 4 carbon atoms, or a substituted or unsubstituted polyfluoroalkyl group with 1 to 4 carbon atoms, and $R_2$ and $R_3$ may bind with each other to form a ring, and in the case of forming a ring, $R_3$ may be a single bond, at least one additive which is included other than the additive having the noblest reduction potential has a potential that is nobler than that of the non-aqueous solvent having the noblest reduction potential to be reduced and decomposed in the second charging step, at least one of the additives that are additionally contained forms an SEI film during the second charging step;

after the second charging step, a step for removing gas from a power generating element; and after the step for removing gas from the power generating element, a third charging step for additional charging, wherein an upper limit voltage in the third charging step is higher than an upper limit voltage in the second charging step.

2. The method for producing a non-aqueous electrolyte secondary battery according to claim 1, wherein the step for removing gas from the power generating element is a step for pushing out the gas remaining inside the powder generating element to a peripheral region inside the battery according to application of mechanical force from the outside of the battery.

3. The method for producing a non-aqueous electrolyte secondary battery according to claim 1, wherein the first charging step is performed by constant current and constant voltage charging and the constant voltage charging is performed at voltage for having a current value of less than 0.01 C.

4. The method for producing a non-aqueous electrolyte secondary battery according to claim 1, wherein the second charging step is performed by constant current and constant voltage charging and the constant voltage charging is performed at voltage for having a current value of less than 0.01 C.

5. The method for producing a non-aqueous electrolyte secondary battery according to claim 1, wherein the non-aqueous solvent comprises ethylene carbonate.

6. The method for producing a non-aqueous electrolyte secondary battery according to claim 1, wherein the oxalate compound is at least one selected from a group consisting of lithium tetrafluorooxalate phosphate, lithium difluorooxalate borate, lithium bisoxalate borate, and lithium difluoro bisoxalate phosphate.

7. The method for producing a non-aqueous electrolyte secondary battery according to claim 1, wherein the disulfonic acid ester compound is at least one selected from a group consisting of methylene methane disulfonate, ethylene methane disulfonate, propylene methane disulfonate, dimethylmethane disulfonate, diethylmethane disulfonate, and ethylmethylmethane disulfonate.

8. The method for producing a non-aqueous electrolyte secondary battery according to claim 1, wherein the additive which is included other than the additive having the noblest reduction potential is at least one selected from a group consisting of vinylene carbonate, fluoroethylene carbonate, vinylethylene carbonate, 1,3-propanesultone, 1,4-butanesultone, 1,3-propenesultone, succinonitrile, and adiponitrile.

9. The method for producing a non-aqueous electrolyte secondary battery according to claim 1, wherein the additive having the noblest reduction potential has the concentration of 0.5 to 3.5% by weight.

10. The method for producing a non-aqueous electrolyte secondary battery according to claim 1, wherein total charging time in the second charging step is 0.3 to 8 hours.

* * * * *